United States Patent
Baab

[11] 3,923,577
[45] Dec. 2, 1975

[54] METHOD FOR MAKING A MULTI-COMPONENT ARTICLE

[75] Inventor: William E. Baab, Tulsa, Okla.

[73] Assignee: Poly-Version, Inc., Tulsa, Okla.

[22] Filed: Apr. 2, 1973

[21] Appl. No.: 346,740

[52] U.S. Cl. .................... 156/251; 2/169; 2/192; 156/306; 206/216; 206/278
[51] Int. Cl.² .................... B32B 31/02; B32B 31/04; A41D 19/02
[58] Field of Search .......... 206/278, 390, 438, 216; 2/159, 169, 192; 53/39, 40; 156/209, 227, 251, 261, 267, 306

[56] References Cited
UNITED STATES PATENTS

| | | | |
|---|---|---|---|
| 3,028,576 | 4/1962 | Gerard | 156/251 |
| 3,128,473 | 4/1964 | Clark | 2/169 |
| 3,160,273 | 12/1964 | Reuther et al. | 206/390 |
| 3,162,561 | 12/1964 | Farkas | 53/39 |
| 3,229,875 | 1/1966 | Stoller | 206/390 |
| 3,384,083 | 5/1968 | Cozza et al. | 206/438 |
| 3,477,194 | 11/1969 | Corrsin | 53/39 |
| 3,625,790 | 12/1971 | Ayres | 156/251 |
| 3,756,888 | 9/1973 | Kuropa | 156/289 |
| 3,778,323 | 12/1973 | Posner | 156/289 |

Primary Examiner—Douglas J. Drummond
Assistant Examiner—Basil J. Lewris
Attorney, Agent, or Firm—Leonard H. King

[57] ABSTRACT

Apparatus and method for manufacturing a multi-component article is disclosed. The article is comprised of a support layer in the form of a sheet such as paper, toweling or the like, on which is superimposed a plurality of heat sealed products such as disposable plastic gloves, shoe covers, bags, hats, etc. The apparatus and the method of this invention comprise means for concurrently feeding a plurality of heat sealable plastic sheets and a layer of paper and means for successively forming the multiple layers of articles that are secured to the paper backing.

4 Claims, 4 Drawing Figures

METHOD FOR MAKING A MULTI-COMPONENT ARTICLE

The aforementioned Abstract is neither intended to define the invention of the application which, of course, is measured by the claims, nor is it intended to be limiting as to the scope of the invention in any way.

BACKGROUND OF THE INVENTION

1. Field of the Invention

This invention relates generally to disposable plastic articles and more particularly to apparatus and a method for fabricating a multi-component article of manufacture comprising a unitary package made of a disposable plastic material and an absorbent material.

2. Description of the Prior Art

Disposable plastic gloves and the like have long been known in the prior art. U.S. Pat. No. 3,681,784 granted on Aug. 8, 1972 to Donald C. Lindley is one example of just such art. Still another example of the prior art is disclosed in U.S. Pat. No. 3,384,083 granted on May 21, 1968 to John Cozza, et al. In this last mentioned patent a disposable plastic glove is formed with a medicant formed integrally with one of the inner surfaces thereof and the glove is positioned on a paper backing sheet.

A careful reading of the aforementioned issued U.S. patents will reveal at least one characteristic common to all of them. That is, a single article in the form of a disposable plastic glove is formed on a paper or other type of backing sheet. Webs of plastic are fed over a web of the backing sheet and a heated die or the like is brought into contact with the plastic web or webs so as to outline the desired article. The heated die not only forms the article itself but also secures the two layers of plastic to each other. Thus, the plastic gloves may be made automatically in a continuous, large volume manner with little labor, resulting in an extremely low-cost product so that the gloves may be readily disposed of after only a single usage.

SUMMARY OF THE INVENTION

In addition to providing apparatus and a method for forming a disposable plastic glove on a backing sheet, the present invention further provides means for superimposing a second article such as a disposable plastic hat over the first article. Thus the combined, multi-component article of manufacture comprising this invention finds particular utility, for example, in the treatment of hair wherein the hat is utilized to cover and keep the hair warm while the dye is working. The backing sheet may be imprinted with hair treating instructions, and, if sufficiently absorbent, may also be used as a towel to wipe the user's hands, the net effect is to provide a unitary package.

The apparatus comprising the present invention includes means for feeding a backing sheet such as a web of paper onto a carrier which in one embodiment is in the form of a rotating drum. The plastic layers comprising the first article or disposable gloves are then deposited on the paper and on the rotating drum. Subsequently, a heated die, which may have a mold release agent applied thereto, is applied to the first two layers of plastic film in order to define the gloves and at the same time heat seal the two layers of the gloves together. The remainder of the first two layers of plastic that does not form the gloves is then removed by any suitable means such as the application of suction to the periphery of the rotating drum.

Two additional layers of plastic film, which may initially be in a double width form that is folded longitudinally by conventional means is then deposited over the previously formed gloves and a second heated die heat seals a transverse line in order to define the side edges of the second article or hat. The second die may also be provided with mold release agent application means. The multi-component product is thereby finished except for the separation thereof from the remainder of the webs and this may be done by a conventional sensor in combination with a conventional cut-off device.

Accordingly, it is an object of the present invention to provide an improved article of manufacture including a plurality of components that are sufficiently inexpensive so as to be readily disposable after a single usage.

It is another object of the present invention to provide improved apparatus for forming the above-mentioned article of manufacture.

A further object of the present invention is to provide an improved method for forming a multi-component article of manufacture, as described above.

A specific object of the present invention is to provide an article for manufacture consisting of disposable gloves and a disposable hat superimposed on a paper-like backing sheet.

These and other objects, features and advantages of the invention will, in part, be pointed out with particularity and will, in part, become obvious from the following more detailed description of the invention, taken in conjunction with the accompany drawing, which forms an integral part thereof.

BRIEF DESCRIPTION OF THE DRAWING

In the various figures of the drawing, like reference characters designate like parts.

In the drawing.

DESCRIPTION OF THE PREFERRED EMBODIMENT

Figure 2:
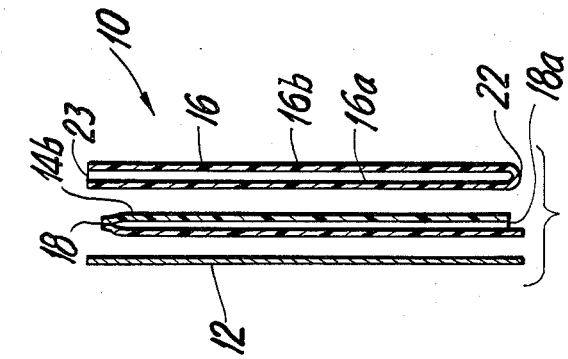
FIG. 2 is a sectional, elevational view taken along line 2—2 of FIG. 1.

As described hereinabove, the present invention, in its broadest aspect, provides a method and apparatus for fabricating a multi-component article of manufacture wherein the several components are readily disposable after a single usage. One practical embodiment of the present invention is shown in the drawing as comprising a pair of disposable plastic gloves and a disposable plastic hat. It should be clearly understood that neither the gloves nor the hat are intended to be accurately fitted.

Figure 1:
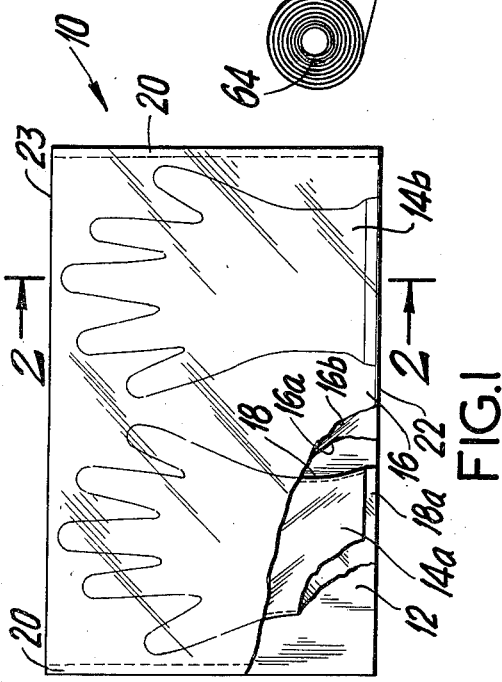
FIG. 1 is a plan view partially broken away illustrating the improved multi-component article of manufacture comprising the present invention.

In the drawing, and in particular in FIGS. 1 and 2, it will be seen that there is provided an improved article of manufacture 10 comprising a paper-like backing sheet 12 that is adapted to have indicia or suitable instructions imprinted thereon. The backing sheet 12 may be made of a moisture absorbent material so as to serve as a towel. There is also formed a pair of disposable plastic gloves 14a and 14b as well as a disposable plastic hat 16. By means to be described more fully hereinafter the marginal edges 18 of the gloves 14a and 14b, with the exception of the edge 18a through which the hand is adapted to be inserted, are heat sealed to each other. The transverse edges 20 of the hat 16 are also sealed to each other. As shown particularly in FIG. 2, an integral seam 22 is formed by folding over the two layers 16a and 16b of plastic material that form the hat 16 to define an open end 23. The structure for accomplishing this is well known in the art and will be described in connection with the apparatus for forming the present invention.

Figure 4:
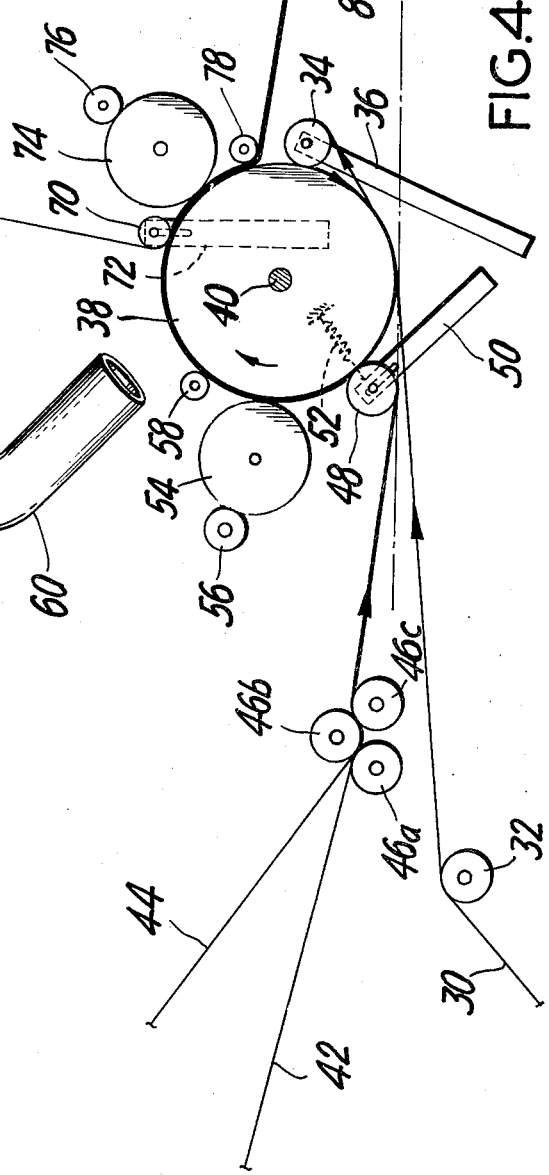
FIG. 4 is a schematic side elevational view illustrating a structure comprising the present invention for forming the improved disposable article of manufacture described hereinabove.

Turning now specifically to FIG. 4, there is shown the apparatus that is used for accomplishing the method of the present invention and for forming the improved article of manufacture of the present invention. A first web 30 of a flexible moisture absorbent material, such as paper that is adapted to form a support layer, is passed over a tension roller 32 which is suitably journaled for rotation. The web of paper 30 then passes over and almost completely around a lay-on roller 34 that is rotatably mounted on a pivotally supported arm 36. The roller 34 applies the paper to the peripheral surface of a carrier such as a drum 38 that is adapted to rotate about an axle 40. Suitable means such as a motor (not shown) may be used for driving the drum 38.

Concurrently with the feeding of the paper web 30, a pair of heat sealable, thermoplastic film layers 42 and 44, typically between 0.0005 and 0.007 inch thick, are passed through a plurality of tension rollers 46a, 46b and 46c that transport the two layers 42 and 44 to an adjustable lay-on roller 48 which is pivotally mounted on an arm 50. Spring means 52 bias the roller 48 in the direction towards the peripheral surface of the drum 38 so that both film layers 42 and 44 are pressed downwardly on the surface of the paper web 30.

While the drum 38 rotates the paper layer 30 and the film layers 42 and 44 are carried by the peripheral surface thereof past a die member 54 that is provided with selected heated poortions in the shape of the desired article. In the embodiment described herein the heated portions of the die member 54 will have the shape of the gloves 14a and 14b shown in FIG. 1. When the film layers 42 and 44 are passed between the peripheral surfaces of the rotating die member 54 and the drum 38, the heat from the die member will heat seal the two layers 42 and 44 only along the lines designated 18 in FIG. 2 to thereby form the gloves. A roller 56 that is adapted to apply a suitable mold release agent such as silicone may be provided in contact with the peripheral surface of the heated die member 54.

Immediately downstream of the heated die member 54, in the direction of rotation of the drum member 38, there is provided a film and paper support roller 58 that serves to retain the formed gloves 14a and 14b on the surface of the paper web 30. The remainder of the material of the film layers 42 and 44 do not form the gloves 14a and 14b is removed by a scrap removal system generally designated by the reference character 60 which is adapted to apply suction to the non-formed plastic layers.

Figure 3:
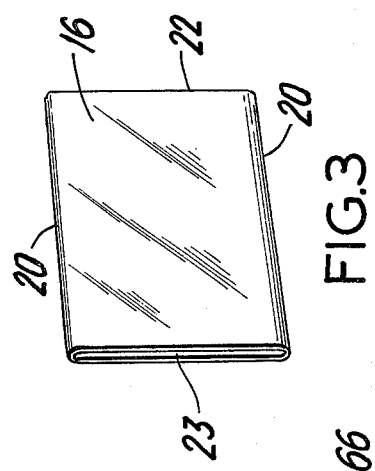
FIG. 3 is a perspective view of one of the articles comprising this invention.

Still another layer of heat sealable thermoplastic material 62, typically between 0.0005 and 0.007 inch thick, is applied to the moving drum 38 subsequent to the formation of the gloves 14a and 14b as described hereinabove. It is convenient to provide the web 62 from a double width source 64 and then pass the material over a conventional folder 66 that is well known in the art. The folded-over web 62 passes over a tension roller 68 and then an adjustable film lay-on roller 70 that is pivotally supported on an arm 72. Thus, as shown in FIG. 4, the double thickness web 62 is positioned over the formed gloves 14a and 14b. Immediately downstream of the film lay-on roller 70 there is provided another die member 74 having a heated portion that is adapted to form the transverse seal lines 20 shown in FIG. 1. This last operation, in conjunction with the integral seam 22 that is formed by folding over the double width film web 62, forms the generally rectangularly shaped hat 16 shown in FIG. 3. If desired, a roller 76 that is adapted to carry a supply of a mold release agent such as silicone may be placed in contact with the peripheral surface of the second heated die member 74. A support roller 78 immediately downstream of the die member 74 maintains the layers of plastic film 42, 44 and 62 against the paper web 30.

A sensor 80, a pair of draw rollers 82 and 84 and cut-off means 86 and 88 are provided downstream of the support roller 78 in order to separate each of the articles 10 from the remainder of their respective webs. Means not shown may also be provided for collecting the cut-off articles 10.

The invention has been described in terms of a plastic hat formed over a pair of gloves. The hat being composed of a pair of sheets sealed on three sides, is actually a bag. Additional articles may be formed in successive layers by providing additional rotary dies 54, 74 and plastic sheets 42, 44 and 62. The uppermost articles would have larger perimeters than that of the lower layers.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. A method for manufacturing a unitary package containing at least two separately usuable articles of wearing apparel, said method comprising the steps of:
   a. feeding a flexible support layer onto the surface of a moving carrier;
   b. depositing a sufficient number of layers of a first material on the flexible support layer;
   c. forming the first article in the shape of a glove from the first material while the first material is positioned on the flexible support layer such that the first article may be subsequently removed from the support layer and used independently thereof;
   d. depositing a sufficient number of layers of a second material over the formed first article; and
   e. forming the second article in the shape of a hat from the second material while the second material is positioned over the first formed article whereby the second formed article may be subsequently removed and be used independently of the first article.

2. The method in accordance with claim 1 wherein said forming steps are performed while the carrier is moving.

3. The method in accordance with claim 1 wherein the first and second materials are plastic films and said forming step comprises applying heat in a predetermined pattern.

4. The method in accordance with claim 3, wherein said forming step comprises die cutting the first and second layers of material.

* * * * *